United States Patent
Bakshi et al.

(10) Patent No.: US 11,647,387 B2
(45) Date of Patent: May 9, 2023

(54) PROVISION OF ONE-TIME PASSWORD AFTER ESTABLISHING A SECURE CONNECTION WITH A TARGETED DEVICE

(71) Applicant: ZUMIGO, INC., San Jose, CA (US)

(72) Inventors: Chirag C. Bakshi, San Jose, CA (US); Harish Manepalli, San Jose, CA (US); Venkatarama Parimi, Dublin, CA (US)

(73) Assignee: ZUMIGO, INC., San Jose, CA (US)

( * ) Notice: Subject to any disclaimer, the term of this patent is extended or adjusted under 35 U.S.C. 154(b) by 822 days.

(21) Appl. No.: 16/151,187

(22) Filed: Oct. 3, 2018

(65) Prior Publication Data

US 2020/0112857 A1    Apr. 9, 2020

(51) Int. Cl.
*H04L 29/06* (2006.01)
*H04W 12/06* (2021.01)
*G06F 16/9538* (2019.01)
*G06Q 20/40* (2012.01)

(52) U.S. Cl.
CPC ...... *H04W 12/068* (2021.01); *G06F 16/9538* (2019.01); *G06Q 20/40* (2013.01)

(58) Field of Classification Search
CPC .......... H04W 12/0608; G06F 16/9538; G06Q 20/40; H04L 63/067
USPC .......................................................... 726/7
See application file for complete search history.

(56) References Cited

U.S. PATENT DOCUMENTS

| 10,552,823 | B1 * | 2/2020 | Woodward | G06Q 20/322 |
| 2009/0305722 | A1 * | 12/2009 | Tiedeman | H04W 4/20 455/456.1 |
| 2011/0082767 | A1 | 4/2011 | Ryu et al. | |
| 2011/0307388 | A1 * | 12/2011 | Kim | G06Q 20/3674 705/67 |

(Continued)

FOREIGN PATENT DOCUMENTS

| KR | 10-2011-0037666 A | 4/2011 |
| KR | 10-1656458 B1 | 9/2016 |
| KR | 10-2017-0051916 A | 5/2017 |

OTHER PUBLICATIONS

Marforio et al. "Smartphones as Practical and Secure Location Verification Tokens for Payments," NDSS 2014, Feb. 22, 2014, 15 pages.

(Continued)

*Primary Examiner* — Evans Desrosiers
(74) *Attorney, Agent, or Firm* — Kim & Stewart LLP

(57) ABSTRACT

A one-time password (OTP) is transmitted to an authorized wireless device for use an authentication factor, even though the OTP may be intercepted or otherwise viewed with an unauthorized device. When a secure request is initiated that requires entry of an OTP as an authentication factor, a hyperlink is transmitted to a wireless device from which the secure request is initiated. When the hyperlink is selected, a connection is established with an entity that determines mobile number information associated with the SSL connection. Comparison of the determined mobile number information and the mobile number of the wireless device to (Continued)

which the hyperlink was intended to be sent indicates whether the wireless device that has established the SSL connection is the authorized wireless device. The OTP is displayed on the wireless device after that device has been verified as the authorized wireless device.

15 Claims, 4 Drawing Sheets

(56) References Cited

U.S. PATENT DOCUMENTS

| | | |
|---|---|---|
| 2018/0103409 A1* | 4/2018 | Pawar .................. H04W 4/025 |
| 2018/0247296 A1 | 8/2018 | Win et al. |
| 2019/0253499 A1* | 8/2019 | Ferrara ................ H04L 51/046 |

OTHER PUBLICATIONS

International Search Report and Written Opinion dated Jan. 14, 2020 in corresponding International Application No. PCT/US2019/053016, 11 pages.

* cited by examiner

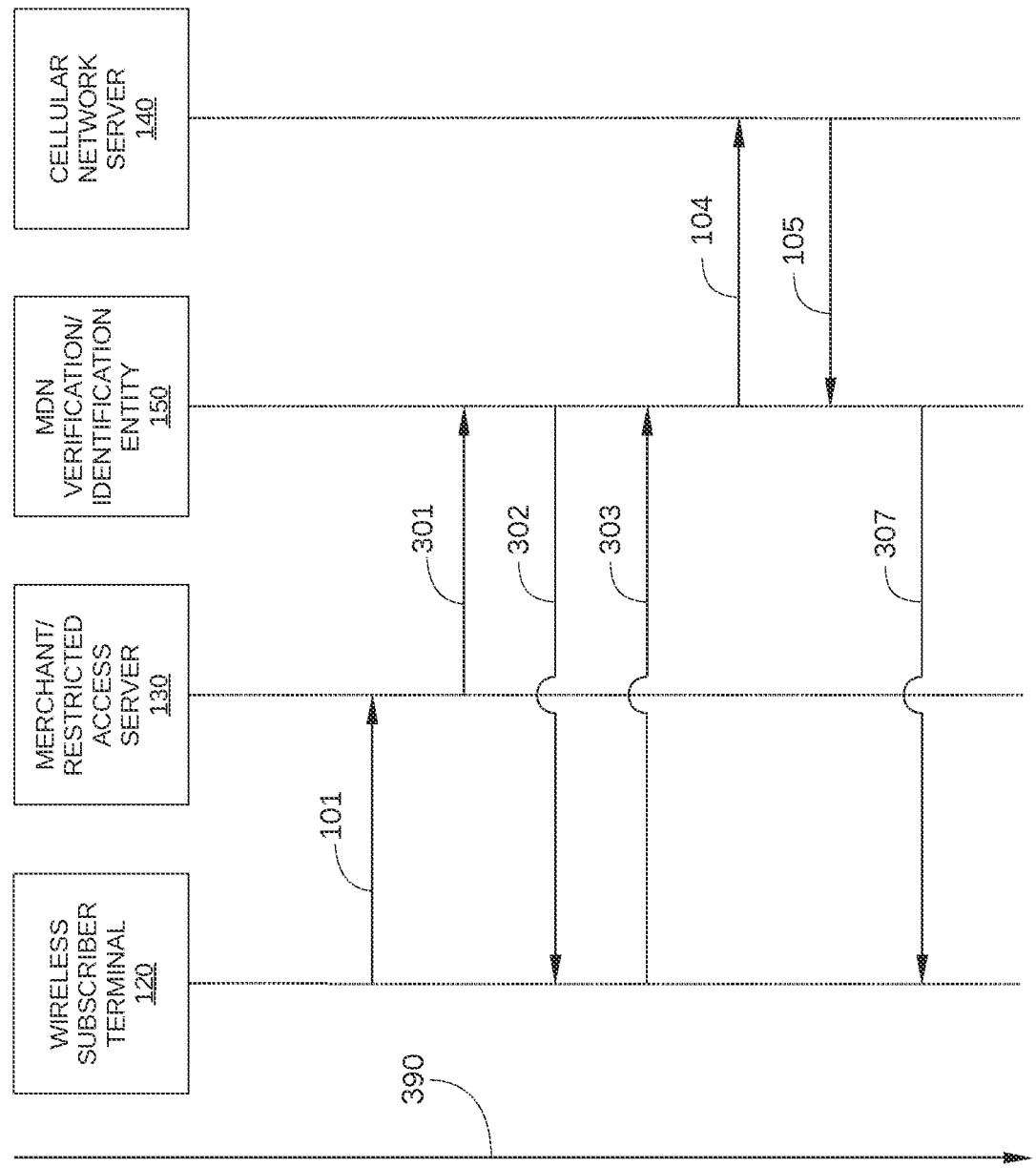

PROVISION OF ONE-TIME PASSWORD AFTER ESTABLISHING A SECURE CONNECTION WITH A TARGETED DEVICE

BACKGROUND OF THE INVENTION

Field of the Invention

Embodiments of the present invention generally relate to identity authentication systems and, more specifically, to provision of a one-time password after establishing a secure connection with a targeted device.

Description of the Related Art

In resetting a password for an online bank account or other account associated with sensitive information, it has become common practice to employ possession of a mobile phone that is linked to the account holder as an authentication factor. That is, possession of such a mobile phone can be a credential for the identity of the account holder. For example, when performing a suspicious action that is frequently fraudulent, such as resetting a password for a bank account via an application on a smartphone, a user may be required to confirm his or her identity by entering a one-time password (OTP) that is sent to the smartphone. To prevent a fraudster or other unauthorized person from resetting a password via a different phone, an authorization entity verifies that the phone number of the smartphone receiving the OTP is actually linked to the holder of the bank account and notifies the bank accordingly. When the phone number of the smartphone receiving the OTP is not linked to the holder of the bank account, the authorization entity notifies the bank that the identity of the account holder does not match the identity linked to the phone number, and the password reset request is rejected.

While sending an OTP to a user's mobile device can provide automated identity authentication for an online password reset, one drawback to this approach is that other devices besides the user's mobile device may have access to the OTP. As a result, when such a device is in the possession of a fraudster, the OTP can be employed by the fraudster to perform an unauthorized activity. For example, when an OTP is sent to a user's mobile device via a short message service (SMS) text message, malware loaded on the user's mobile device can forward the SMS message to a fraudster's device. Thus, the fraudster can receive the OTP that was intended only for the user's mobile device, and use the OTP to obtain unauthorized access to the user account for which the OTP was sent. In another example, cloud-computing services now enable a user to access an SMS message from multiple devices. Therefore, if a fraudster can gain access to a user's cloud-computing service and add a fraudulent device to that service, the fraudster can intercept SMS messages intended to provide an OTP to that user. Again, with this approach, the fraudster can receive an OTP that was intended only for the user's mobile device and obtain unauthorized access to a user account for which the OTP was sent, such as a bank account.

SUMMARY OF THE INVENTION

According to one or more embodiments, an OTP is transmitted to an authorized wireless subscriber terminal for use as an authentication factor, even though the OTP may be intercepted or otherwise viewed with an unauthorized wireless subscriber terminal. According to the embodiments, the OTP is only displayed on a smartphone, electronic tablet, or other wireless subscriber terminal after that wireless subscriber terminal has been verified as the wireless device to which the hyperlink was intended to be sent. Specifically, when a secure request is initiated that requires entry of an OTP as an authentication factor, a hyperlink is transmitted to a wireless device from which the secure request is initiated. When a user selects the hyperlink, an SSL connection is established with an MDN identification entity that determines mobile number information associated with the SSL connection. Comparison of the determined mobile number information and the mobile number of the wireless device to which the hyperlink was intended to be sent indicates whether the wireless device that has established the SSL connection is in fact the authorized wireless device.

According to one embodiment, a method of activating a one-time password (OTP) at an authorized wireless subscriber terminal includes receiving a request from a first wireless subscriber terminal for a secure request; transmitting a message to the first wireless subscriber terminal, wherein the message includes a hyperlink for establishing communication with a mobile number identification entity; receiving a phone number associated with the secure request from the mobile number identification entity; determining that the phone number associated with the secure request matches a phone number of the authorized wireless subscriber terminal; and upon determining the match, causing the OTP to be displayed on the first wireless subscriber terminal.

According to another embodiment, a method of activating a one-time password (OTP) at an authorized wireless subscriber terminal includes receiving a phone number for the authorized wireless subscriber terminal from a computing device; transmitting a message to a first wireless subscriber terminal that is a different computing device than the first computing device, wherein the message includes a hyperlink for establishing communication with the first wireless subscriber terminal; receiving data traffic from the first wireless subscriber terminal via the communication; determining a phone number for the first wireless subscriber terminal based on information included in the data traffic; determining that the phone number for the first wireless subscriber terminal matches the phone number for the authorized wireless subscriber terminal; and upon determining the match, causing the OTP to be displayed by the first wireless subscriber terminal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a block diagram illustrating the steps performed by the wireless communication system of FIG. 3 as the steps occur sequentially along a time line, according to one or more embodiments of the invention.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
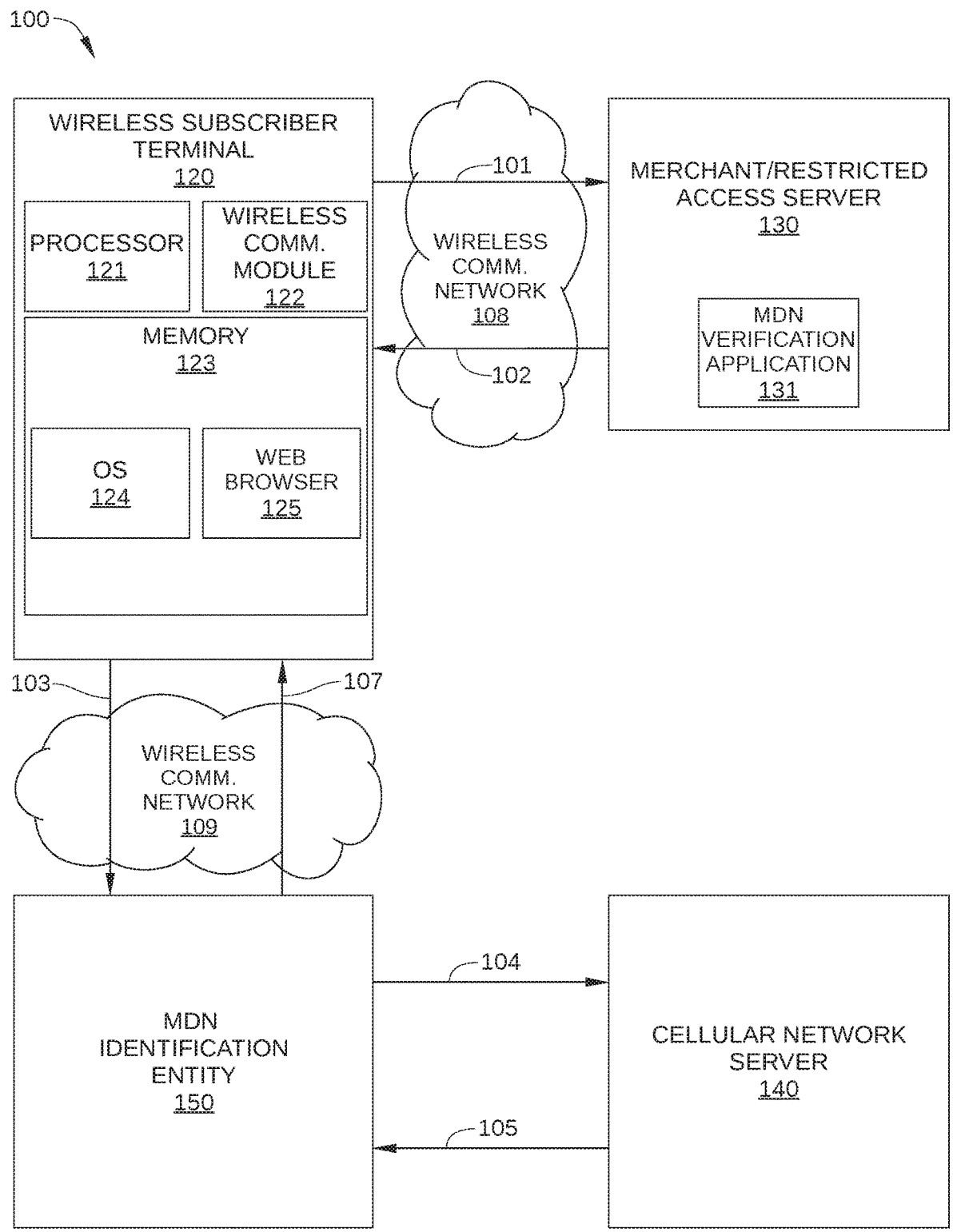
FIG. 1 is a block diagram of a wireless communication system, according to one or more embodiments of the present invention.

FIG. 1 is a block diagram of a wireless communication system 100, according to one or more embodiments of the present invention. As described below, wireless communication system 100 enables verification of a mobile directory number (MDN) of a wireless subscriber terminal, such as a smartphone or other wireless device, for the secure provision or activation of a one-time password (OTP) to an authorized user via the user's wireless device. When an OTP is transmitted to the authorized user's wireless device, verification of the MDN of the wireless device that actually receives the OTP is performed via a hyperlink that is transmitted to the authorized user's wireless device. When the authorized user clicks on or otherwise selects the hyperlink, a secure sockets layer (SSL) connection is established between the authorized user's wireless device and an MDN identification entity. Based on information contained in data traffic transmitted to the MDN identification entity via the SSL connection, the MDN identification entity determines the MDN of the wireless device on which the hyperlink was selected. The MDN determined by the MDN identification entity can then be checked for a match with the MDN of the wireless device to which the hyperlink was intended to be sent, i.e., the wireless device of the authorized user. When the determined MDN matches the MDN of the wireless device to which the hyperlink was intended to be sent, the OTP is displayed on the wireless device on which the hyperlink was selected. Thus, when the hyperlink is intercepted by a fraudster using the fraudster's wireless device, the OTP is not displayed on the fraudster's wireless device, because the MDN of the fraudster's wireless device will not match the MDN of the wireless device to which the hyperlink was intended to be sent.

Wireless communication system 100 includes a wireless subscriber terminal 120, a merchant/restricted access server 130, a cellular network server 140, and an MDN identification entity 150. Wireless subscriber terminal 120 is communicatively coupled to merchant/restricted access server 130 by a wireless communication network 108 and to MDN identification entity 150 by a wireless communication network 109. Wireless communication network 108 and wireless communication network 109 can each include a wireless local area network (WLAN), a cellular network, or a combination of both. Furthermore, while wireless subscriber terminal 120 is shown in FIG. 1 to be communicatively coupled to merchant/restricted access server 130 by wireless communication network 108 and to MDN identification entity 150 by wireless communication network 109, in other embodiments, one or more additional communication networks may also be employed to communicatively couple wireless subscriber terminal 120, merchant/restricted access server 130, and MDN identification entity 150, such as the Internet, among others.

The WLAN included in wireless communication network 108 and/or wireless communication network 109 is hereinafter referred to as "the WLAN". The WLAN enables compatible devices to connect to the Internet via a wireless access point, or "hotspot." For example, in some embodiments, the WLAN is a WiFi network that includes one or more devices based on the Institute of Electrical and Electronics Engineers (IEEE) 802.11 standard. Thus, any suitably configured wireless communication device that can connect to the WLAN, such as a smartphone with WiFi capability, can perform data transfer to and from the Internet.

The cellular network included in wireless communication network 108 and/or wireless communication network 109 is hereinafter referred to as "the cellular network". The cellular network enables two-way wireless communication with wireless subscriber terminals, such as wireless subscriber terminal 120. For example, in some embodiments, the cellular network includes one or more base stations (not shown) that are in two-way wireless communication with wireless subscriber terminals, and with a landline system (not shown), such as the public switched telephone network (PSTN) or any other wired network capable of voice/data connections. When an active call associated with wireless subscriber terminal 120 is underway in the cellular network, a suitable base station translates a forward trunk signal in the landline system to a properly formatted radio signal, which is transmitted by an antenna to wireless subscriber terminal 120 over an air interface. Wireless subscriber terminal 120 performs complementary operations to enable the two-way voice or data traffic over the air interface.

The term "voice traffic," as used herein, includes the communication of conventional audio signals that are carried by the landline system and the cellular network included in wireless communication network 108 and/or wireless communication network 109. The term "data traffic," as used herein, includes data, such as facsimile or computer data, that are carried by the landline system and cellular network, and/or by the WLAN included in wireless communication network 108 and/or wireless communication network 109.

Wireless subscriber terminal 120 can be a cellular telephone, a smart phone, a personal digital assistant (PDA), a tablet computer, or any other mobile computing device configured to wirelessly access the WLAN and the cellular network, and to practice one or more embodiments of the present invention. To that end, in some embodiments, wireless subscriber terminal 120 includes a processor 121, a wireless communication module 122, and a memory 123. Processor 121 may be any suitable processing unit implemented as a central processing unit (CPU), an application-specific integrated circuit (ASIC), a field programmable gate array (FPGA), any other type of processing unit, or a combination of different processing units. Wireless communication module 122 may be any suitable electronics package and or chipset configured to enable wireless communication with the WLAN and the cellular network. Thus, in some embodiments, wireless communication module 122 includes cellular capability and WiFi capability, among others. Alternatively or additionally, in some embodiments, wireless communication module 122 includes Bluetooth capability. Memory 123 can include any suitable volatile and/or nonvolatile memory (e.g., random-access memory (RAM), read-only memory (ROM), flash memory, a magnetic hard drive, etc.), and is configured to store instructions and/or data associated with an operating system (OS) 124, a web browser 125, and/or other software applications.

OS 124 supports the functions of processor 121, including scheduling tasks and sending commands to web browser 125, memory 123, and wireless module 122, managing the power state of wireless subscriber terminal 120, initiating execution of applications on processor 121, managing sockets and TCP connections, and the like.

Merchant/restricted access server 130 can be any entity that can be accessed by wireless subscriber terminal 120 via wireless communication network 108 and can benefit from the use of an OTP in the identification and/or authorization of a user prior to access by the user. More specifically, merchant/restricted access server 130 can be any entity that provides access to a vendor website or sensitive information and/or enables financial transactions. For instance, merchant/restricted access server 130 can include a website, an application, a server, a database, an application running on an instance of a virtual machine, and the like. Thus, in some embodiments, merchant/restricted access server 130 is a public or open server, whereas in other embodiments, merchant/restricted access server 130 is a restricted access only server. For example, in some embodiments, merchant/restricted access server 130 can be a vendor website, an e-mail server or application that enables interaction with an e-mail server, a banking website, a cloud storage server, and the like. Thus, while merchant/restricted access server 130 is depicted as a server computing device in the embodiment illustrated in FIG. 1, merchant/restricted access server 130 can also be any other computing device, application, or other entity that can be accessed by wireless subscriber terminal 120 via wireless communication network 108.

As noted above, in some embodiments, merchant/restricted access server 130 stores and/or provides access to sensitive information and/or enables important data transactions or financial transactions. As such, interactions with merchant/restricted access server 130, particularly online interactions, generally require authentication of user identity. For example, in some embodiments, an authentication factor employed by merchant/restricted access server 130 can be the entry by a user of an OTP that has been sent to the wireless subscriber terminal 120 associated with that user or account. In such embodiments, user access to merchant/restricted access server 130 via wireless subscriber terminal 120 is not approved unless the wireless subscriber terminal 120 has been verified to be the intended recipient device of the OTP. Thus, when a fraudster intercepts an OTP that can enable access to an account associated with merchant/restricted access server 130, the OTP provided to the fraudster is not considered valid, since the wireless device employed by the fraudster is not the intended recipient device of the OTP.

In some embodiments, merchant/restricted access server 130 executes an MDN verification application 131. MDN verification application 131 includes executable instructions that enable performance of various embodiments of the invention as described herein. In various embodiments, after the MDN of wireless subscriber terminal 120 is verified to match the MDN of an intended recipient device, MDN verification application 131 transmits a verification to wireless subscriber terminal 120. In response to the verification, wireless subscriber terminal 120 displays an OTP. The intended recipient device is a wireless subscriber terminal associated with an authorized user to whom merchant/restricted access server 130 has sent the OTP. For example, when the user of wireless subscriber terminal 120 attempts to perform an action with wireless subscriber terminal 120 that requires the OTP to be entered (such as a password reset action on the user's account associated with merchant/restricted access server 130), the intended recipient device is the wireless subscriber terminal 120 of that user.

In particular, MDN verification application 131 is configured to determine whether the mobile number of wireless subscriber terminal 120 matches the mobile number of an intended recipient device of an OTP transmitted by merchant/restricted access server 130. That is, MDN verification application 131 electronically confirms that the mobile number, MDN, or MIN of a wireless subscriber terminal 120 that has established an SSL connection with MDN identification entity 150 corresponds to the intended recipient device for the OTP transmitted by merchant/restricted access server 130. Further, by transmitting the verification, MDN verification application 131 causes the display of an OTP to the user of wireless subscriber terminal 120. For example, MDN verification application 131 can send such a verification to web browser 125 in wireless subscriber terminal 120, indicating that the OTP sent previously to wireless subscriber terminal 120 can be displayed. A more detailed description of the functionality of MDN verification application 131 is set forth below in conjunction with FIG. 2.

Cellular network server 140 represents one or more computing devices or servers included in the cellular network that are employed by the provider of the cellular network for communicating control, status, and signaling information between nodes in the cellular network. In some embodiments, cellular network server 140 is included in a Signaling System 7 (SS7) network. In some embodiments, cellular network server 140 includes the capability of the cellular network to allocate Internet protocol (IP) addresses to wireless subscriber terminals 120 and to map currently allocated IP addresses the mobile numbers, MDNs, and/or MINs of wireless subscriber terminals 120. Henceforth, one or more of the mobile number, MDN, and mobile identification number (MIN) of wireless subscriber terminal 120 are referred to collectively or individually herein as the "mobile number" of wireless subscriber terminal 120.

MDN identification entity 150 may be an application that runs on a server or other computing device coupled to the Internet or other communications network, and is configured to execute mobile number verification operations as described herein. MDN identification entity 150 is a mobile number identification entity that is configured to identify the mobile number of wireless subscriber terminal 120 when wireless subscriber terminal 120 establishes an SSL connection with MDN identification entity 150 via wireless communication network 109. MDN identification entity 150 determines the mobile number of wireless subscriber terminal 120 based on the IP address associated with wireless subscriber terminal 120 and the SSL connection. For example, in some embodiments, when the SSL connection is established with MDN identification entity 150 by wireless subscriber terminal 120, MDN identification entity 150 is configured to extract the IP address of wireless subscriber terminal 120 and determine which mobile carrier is associated with wireless subscriber terminal 120 based on the extracted IP address. MDN 150 identification entity 150 then queries that mobile carrier, e.g., cellular network server 140, for the mobile number that is associated with the extracted IP address. Thus, when determined by MDN identification entity 150, the mobile number of wireless subscriber terminal 120 is electronically verified, and is not merely data entered by the user of wireless subscriber terminal 120.

During operation of wireless communication system 100 and as described below in conjunction with FIG. 2, wireless subscriber terminal 120 transmits a secure request 101; MDN identification entity 150 transmits a query 104 to cellular network server 140, receives a reply 105 from cellular network server 140, and transmits number information 106 to merchant/restricted access server 130; and merchant/restricted access server 130 transmits a verification communication 102 and a verification 107 to wireless subscriber terminal 120.

Figure 2:
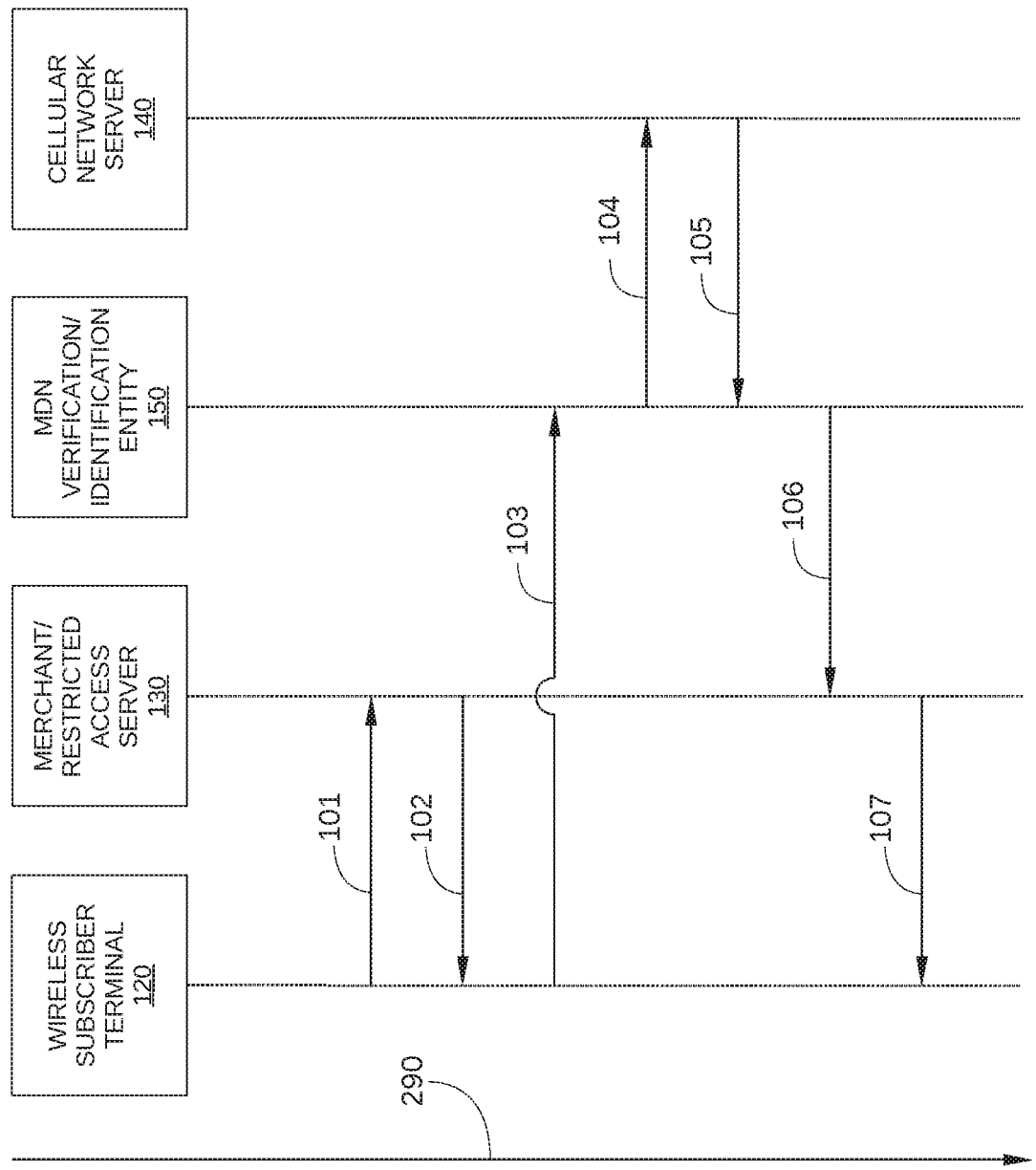
FIG. 2 schematically illustrates the steps performed by the wireless communication system of FIG. 1 as the steps occur sequentially along a time line, according to one or more embodiments of the invention.

FIG. 2 schematically illustrates the steps performed by wireless communication system 100 as the steps occur sequentially along a time line 290, according to one or more embodiments of the invention. As described above, wireless communication system 100 electronically verifies that the mobile number of wireless subscriber terminal 120 matches the mobile number of an intended recipient device of an OTP transmitted by merchant/restricted access server 130. In addition, when the mobile number of wireless subscriber terminal 120 matches the mobile number of the intended recipient device, wireless communication system 100 allows the OTP to be displayed by wireless subscriber terminal 120.

When a user attempts to initiate an online transaction or otherwise interact with merchant/restricted access server 130, merchant/restricted access server 130 may require an OTP to be transmitted by wireless subscriber terminal 120 as an authentication factor. For example, after a connection is established between wireless subscriber terminal 120 and merchant/restricted access server 130 via wireless communication network 108, a user may select an icon displayed on wireless subscriber terminal 120 to initiate secure request 101, such as a login request, a reset password request, etc. The icon may be displayed by, for example, web browser 125. Secure request 101 can be transmitted to merchant/restricted access server 130 via wireless communication network 108.

MDN verification application 131 then transmits verification communication 102 that includes a hyperlink for establishing a wireless connection with MDN identification entity 150. In addition to the hyperlink, verification communication 102 may also include suitable information for the display of a web page by web browser 125, such as a hypertext markup language (html) file. Upon receipt of verification communication 102, web browser 125 generally causes the hyperlink to be displayed by wireless subscriber terminal 120, so that a user of wireless subscriber terminal 120 can click on or otherwise select the hyperlink and establish a wireless connection with MDN identification entity 150. In some embodiments, verification communication 102 further includes an OTP that, when entered into a suitable field of web browser 125 by a user, completes an authentication factor for secure request 101. In such embodiments, the OTP is stored in wireless subscriber terminal 120, for example in memory 123 by web browser 125, but is not displayed by web browser 125 to the user of wireless subscriber terminal 120 when first received.

When a user clicks on or otherwise selects the hyperlink displayed on wireless subscriber terminal 120, web browser 125 establishes an SSL connection between wireless subscriber terminal 120 and MDN identification entity 150. In so doing, data traffic 103 is transmitted to MDN identification entity 150 that enables MDN identification entity 150 to determine the IP address of wireless subscriber terminal 120 associated with the SSL connection.

MDN identification entity 150 then determines number information associated with the determined IP address, such as the MDN of wireless subscriber terminal 120. In some embodiments, MDN identification entity 150 queries the appropriate cellular network server 140 via a query 104 for the mobile number that is associated with the determined IP address and receives such number information via a reply 105. For example, in some embodiments, MDN identification entity 150 determines the mobile number of wireless subscriber terminal 120 based on an Internet Protocol version 6 (IPv6) address included in data traffic 103 received from wireless subscriber terminal 120. The addressable space associated with IPv6 is sized to accommodate a one-to-one mapping of IP addresses and mobile numbers. In addition, IPv6 addresses can be organized to implicitly include metadata in the form of predefined address ranges that are associated with a particular entity, such as a cellular network provide. Thus, upon receipt of data traffic 103 from wireless subscriber terminal 120, MDN identification entity 150 can determine which cellular network provider has allocated the IPv6 address to wireless subscriber terminal 120 based on the IPv6 address included in data packets 203, and transmits query 104 accordingly.

Upon receipt of reply 105 from cellular network server 140, MDN identification entity 150 transmits number information 106 to merchant/restricted access server 130. Number information 106 includes the mobile number that is associated with the IP address determined by MDN identification entity 150.

Upon receipt of number information 106 from MDN identification entity 150, MDN verification application 131 determines whether the number information included in number information 106 matches the number information for the authorized wireless subscriber terminal that is the intended recipient device of an OTP. When MDN verification application 131 determines that the number information included in number information 106 matches the number information for the authorized wireless subscriber terminal, MDN verification application 131 transmits a verification 107 to web browser 125 in wireless subscriber terminal 120 indicating that the OTP sent previously to wireless subscriber terminal 120 can be displayed by wireless subscriber terminal 120. Alternatively, in some embodiments, when MDN verification application 131 determines that the number information included in number information 106 matches the number information for the authorized wireless subscriber terminal, MDN verification application 131 includes the OTP in verification 107. In such embodiments, the OTP is not stored in wireless subscriber terminal 120 while awaiting verification 107.

When the OTP is displayed by web browser 125 on wireless subscriber terminal 120, the user can then enter the OTP in an appropriate field displayed by web browser 125, thereby completing an authorization factor for secure request 101.

In the embodiments described above, some or all of the functionality of MDN verification application 131 resides in merchant/restricted access server 130. In other embodiments, such functionality resides in MDN identification entity 150. One such embodiment is illustrated in FIG. 3.

Figure 3:
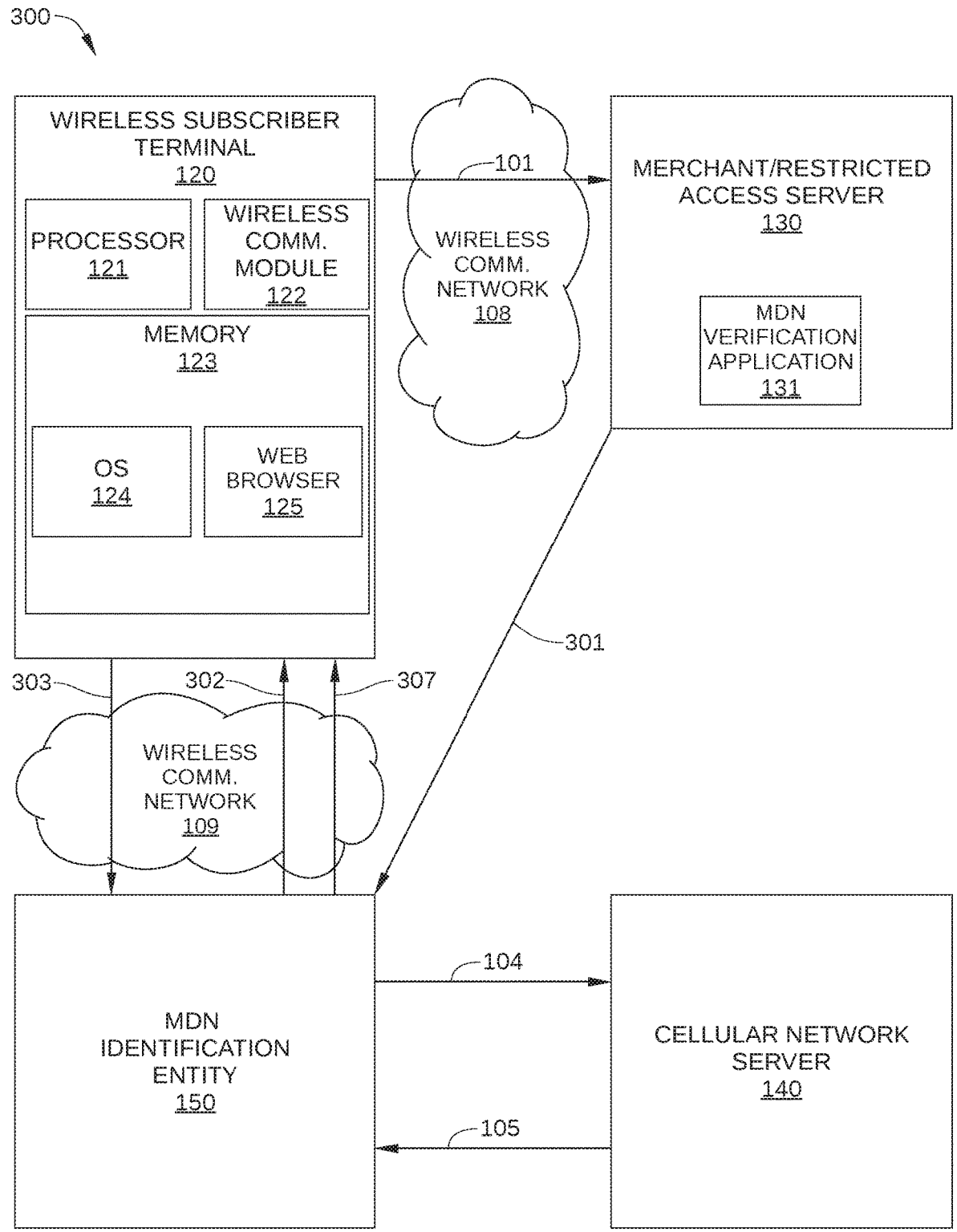
FIG. 3 is a block diagram of a wireless communication system, according to one or more embodiments of the present invention.

FIG. 3 is a block diagram of a wireless communication system 300, according to one or more embodiments of the present invention. Wireless communication system 300 is substantially similar to wireless communication system 100, except the functionality of MDN verification application 131 resides MDN identification entity 150. Therefore, during operation of wireless communication system 300, wireless subscriber terminal 120 transmits a secure request 101 and data traffic 303; merchant/restricted access server 130 transmits number information 301 to MDN identification entity 150; and MDN identification entity 150 transmits a verification communication 302 and a verification 307 to wireless subscriber terminal 120, transmits a query 104 to cellular network server 140, and receives a reply 105 from cellular network server 140.

FIG. 4 schematically illustrates the steps performed by wireless communication system 300 as the steps occur sequentially along a time line 390, according to one or more embodiments of the invention. As described above, wireless communication system 300 electronically verifies that the mobile number of wireless subscriber terminal 120 matches the mobile number of an intended recipient device of an OTP transmitted by merchant/restricted access server 130. In addition, when the mobile number of wireless subscriber terminal 120 matches the mobile number of the intended recipient device, wireless communication system 300 allows the OTP to be displayed by wireless subscriber terminal 120.

When a user attempts to initiate an online transaction or otherwise interact with merchant/restricted access server 130, secure request 101 is initiated as described above in conjunction with FIG. 2. Merchant/restricted access server 130 then transmits number information 301 to MDN identification entity 150 for the authorized wireless subscriber terminal that is the intended recipient device of an OTP. MDN identification entity 150 transmits verification communication 302 (which includes a hyperlink for establishing a wireless connection with MDN identification entity 150) and suitable information for the display of a web page by web browser 125. When a user clicks on or otherwise selects the hyperlink displayed on wireless subscriber terminal 120, web browser 125 establishes an SSL connection between wireless subscriber terminal 120 and MDN identification entity 150. When the SSL connection is established, MDN identification entity 150 determines the IP address of wireless subscriber terminal 120 associated with the SSL connection, as described above in conjunction with FIG. 2. MDN identification entity 150 then determines number information associated with the determined IP address, as described above in conjunction with FIG. 2. For example, in some embodiments, MDN identification entity 150 queries the appropriate cellular network server 140 via a query 104 for the mobile number that is associated with the determined IP address and receives such number information via a reply 105. Upon receipt of number information from cellular network server 140, MDN identification entity 150 determines whether the number information included in reply 105 matches the number information for the authorized wireless subscriber terminal that is the intended recipient device of an OTP. When MDN identification entity 150 determines that the number information included in reply 105 matches the number information for the authorized wireless subscriber terminal, MDN identification entity 150 transmits a verification 307 to web browser 125 in wireless subscriber terminal 120 indicating that the OTP sent previously to wireless subscriber terminal 120 can be displayed by wireless subscriber terminal.

Thus, wireless communication system 300 provides electronic verification that the mobile number of the wireless subscriber terminal 120 from which secure request 101 was received is the wireless subscriber terminal that actually displays the OTP.

In sum, embodiments described herein enable the transmission of an OTP to an authorized wireless subscriber terminal as an authentication factor, even when the OTP can be intercepted or otherwise viewed with an unauthorized wireless subscriber terminal. According to the embodiments, the OTP is only displayed on a smartphone, electronic tablet, or other wireless subscriber terminal after that wireless subscriber terminal has been verified as the wireless device to which the hyperlink was intended to be sent. Specifically, when a secure request is initiated that requires entry of an OTP as an authentication factor, a hyperlink is transmitted to a wireless device from which the secure request is initiated. When a user selects the hyperlink, an SSL connection is established with an MDN identification entity that determines mobile number information associated with the SSL connection. Comparison of the determined mobile number information and the mobile number of the wireless device to which the hyperlink was intended to be sent indicates whether the wireless device that has established the SSL connection is in fact the authorized wireless device.

While the foregoing is directed to embodiments of the present invention, other and further embodiments of the invention may be devised without departing from the basic scope thereof, and the scope thereof is determined by the claims that follow.

What is claimed is:

1. A method of activating a one-time password (OTP) at an authorized wireless subscriber terminal, the method comprising:
   receiving a secure request from a first wireless subscriber terminal;
   transmitting a message to the first wireless subscriber terminal, wherein the message includes a hyperlink for establishing a communication channel with a mobile number identification entity that is a different computing device than the first wireless subscriber terminal;
   receiving a phone number associated with the secure request from the mobile number identification entity, wherein the mobile number identification entity determines, based on an internet protocol (IP) address assigned to the first wireless subscriber terminal, a cellular network provider that provides wireless network services to the first wireless subscriber terminal, and the mobile number identification entity determines the phone number associated with the secure request by querying a server of the cellular network provider;
   determining that the phone number associated with the secure request matches a phone number of the authorized wireless subscriber terminal; and
   in response to the determining of the match, causing the OTP to be displayed by the first wireless subscriber terminal.

2. The method of claim 1, wherein the IP address assigned to the first wireless subscriber terminal is included in data traffic from the first wireless subscriber terminal to the mobile number identification entity via the communication channel.

3. The method of claim 2, wherein the communication channel is established in response to a user selection of the hyperlink that is displayed on the first wireless subscriber terminal.

4. The method of claim 1, wherein the message further includes the OTP.

5. The method of claim 4, wherein the causing of the OTP to be displayed by the first wireless subscriber terminal comprises transmitting an instruction to a web browser running on the first wireless subscriber terminal.

6. The method of claim 1, wherein the causing of the OTP to be displayed by the first wireless subscriber terminal comprises transmitting the OTP in response to determining that the phone number associated with the secure request matches the phone number of the authorized wireless subscriber terminal.

7. The method of claim 1, wherein the phone number associated with the secure request is received from the mobile number identification entity after the first wireless subscriber terminal communicates with the mobile number identification entity.

8. The method of claim 1, wherein the phone number of the authorized wireless subscriber terminal is a mobile directory number uniquely associated with the authorized wireless subscriber terminal.

9. A method of activating a one-time password (OTP) at an authorized wireless subscriber terminal, the method comprising:
- receiving a phone number of the authorized wireless subscriber terminal from a first computing device;
- transmitting a message to a first wireless subscriber terminal that is a different computing device than the first computing device, wherein the message includes a hyperlink for establishing a communication channel with the first wireless subscriber terminal;
- receiving data traffic from the first wireless subscriber terminal via the communication channel;
- determining, based on an internet protocol (IP) address assigned to the first wireless subscriber terminal, a cellular network provider that provides wireless network services to the first wireless subscriber terminal, wherein the IP address is included in the data traffic;
- receiving a phone number of the first wireless subscriber terminal from a server of the determined cellular network provider;
- determining that the phone number of the first wireless subscriber terminal matches the phone number of the authorized wireless subscriber terminal; and
- in response to the determining of the match, causing the OTP to be displayed by the first wireless subscriber terminal.

10. The method of claim 9, further comprising:
- before the receiving of the phone number of the first wireless subscriber terminal, querying the server of the determined cellular network provider for a phone number associated with the IP address.

11. The method of claim 9, wherein the message further includes the OTP.

12. The method of claim 11, wherein the causing of the OTP to be displayed by the first wireless subscriber terminal comprises transmitting an instruction to a web browser running on the first wireless subscriber terminal.

13. The method of claim 9, wherein the causing of the OTP to be displayed by the first wireless subscriber terminal comprises transmitting the OTP in response to the determining of the match.

14. The method of claim 9, wherein the phone number of the authorized wireless subscriber terminal is a mobile directory number uniquely associated with the authorized wireless subscriber terminal.

15. The method of claim 9, wherein the communication channel is established in response to a user selection of the hyperlink that is displayed on the first wireless subscriber terminal.

* * * * *